US008995347B2

(12) United States Patent
Nam et al.

(10) Patent No.: US 8,995,347 B2
(45) Date of Patent: Mar. 31, 2015

(54) APPARATUS AND METHOD FOR PILOT SCRAMBLING FOR ENHANCED PHYSICAL DOWNLINK CONTROL CHANNELS

(71) Applicant: Samsung Electronics Co., Ltd, Suwon-si, Gyeonggi-do (KR)

(72) Inventors: Young-Han Nam, Richardson, TX (US); Boon Loong Ng, Dallas, TX (US); Jianzhong Zhang, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 113 days.

(21) Appl. No.: 13/746,145

(22) Filed: Jan. 21, 2013

(65) Prior Publication Data

US 2013/0188558 A1    Jul. 25, 2013

Related U.S. Application Data

(60) Provisional application No. 61/588,578, filed on Jan. 19, 2012, provisional application No. 61/702,589, filed on Sep. 18, 2012, provisional application No. 61/706,612, filed on Sep. 27, 2012.

(51) Int. Cl.
*H04W 24/02* (2009.01)
*H04W 48/12* (2009.01)

(52) U.S. Cl.
CPC .............. *H04W 24/02* (2013.01); *H04W 48/12* (2013.01)
USPC ........................................ 370/328; 370/252

(58) Field of Classification Search
CPC ............................. H04W 24/02; H04W 48/12
USPC .......... 370/328, 329, 330, 350, 436, 236, 252
See application file for complete search history.

(56) References Cited

U.S. PATENT DOCUMENTS

| | | | |
|---|---|---|---|
| 2011/0038310 A1* | 2/2011 | Chmiel et al. ................ | 370/328 |
| 2011/0075624 A1* | 3/2011 | Papasakellariou et al. ... | 370/329 |
| 2011/0237267 A1* | 9/2011 | Chen et al. .................... | 455/450 |
| 2011/0268050 A1* | 11/2011 | Farajidana et al. ........... | 370/329 |
| 2013/0003604 A1* | 1/2013 | Blankenship et al. ........ | 370/255 |
| 2013/0003663 A1* | 1/2013 | Blankenship et al. ........ | 370/329 |
| 2013/0044692 A1* | 2/2013 | Nory et al. .................... | 370/329 |
| 2013/0107861 A1* | 5/2013 | Cheng et al. .................. | 370/331 |
| 2013/0114517 A1* | 5/2013 | Blankenship et al. ........ | 370/329 |

OTHER PUBLICATIONS

International Search Report dated May 10, 2013 in connection with International Patent Application No. PCT/US2013/022417, 5 pages.
Written Opinion of International Searching Authority dated May 10, 2013 in connection with International Patent Application No. PCT/US2013/022417, 5 pages.
3GPP TSG RAN WG1 Meeting #67; "DM RS sequence setting for downlink CoMP"; San Francisco, USA; Nov. 14-18, 2011; R1-113957; 3 pages.

(Continued)

*Primary Examiner* — Brian D Nguyen

(57) ABSTRACT

A telecommunications system is configured to perform a method for mapping synchronization signals. The method includes transmitting data, reference signals, synchronization signals and control elements to at least one of the plurality of subscriber stations. The method also includes configuring enhanced physical downlink control channel (e-PDCCH) DMRS parameters for each of a plurality of e-PDCCH sets.

20 Claims, 10 Drawing Sheets

(56) References Cited

OTHER PUBLICATIONS

3GPP TSG RAN WG1 Meeting #67; "DMRS Scrambling for Downlink CoMP"; San Francisco, USA; Nov. 14-18, 2011; R1-114226; 4 pages.

3GPP TSG RAN WG1 Meeting #67; "Views on Downlink DMRS sequence"; San Francisco, USA; Nov. 14-18, 2011; R1-113808; 2 pages.

3GPP TSG RAN WG1 Meeting #67; "Considerations on UE-specific DM-RS configuration"; San Francisco, USA; Nov. 14-18, 2011; R1-113732; 3 pages.

3GPP TSG RAN WG1 Meeting #67; "DL DM-RS sequence for Rel-11 CoMP"; San Francisco, USA; Nov. 14-18, 2011; R1-114074; 7 pages.

* cited by examiner

US 8,995,347 B2

APPARATUS AND METHOD FOR PILOT SCRAMBLING FOR ENHANCED PHYSICAL DOWNLINK CONTROL CHANNELS

CROSS-REFERENCE TO RELATED APPLICATION(S) AND CLAIM OF PRIORITY

The present application claims priority to U.S. Provisional Patent Application Ser. No. 61/588,578, filed Jan. 19, 2012, entitled "PILOT SCRAMBLING FOR ENHANCED PHYSICAL DOWNLINK CONTROL CHANNELS", U.S. Provisional Patent Application Ser. No. 61/702,589, filed Sep. 18, 2012, entitled "PILOT SCRAMBLING FOR ENHANCED PHYSICAL DOWNLINK CONTROL CHANNELS", and U.S. Provisional Patent Application Ser. No. 61/706,612, filed Sep. 27, 2012, entitled "PILOT SCRAMBLING FOR ENHANCED PHYSICAL DOWNLINK CONTROL CHANNELS". The contents of the above-identified patent documents are incorporated herein by reference.

TECHNICAL FIELD

The present application relates generally to wireless communications and, more specifically, to a system and method for pilot signal scrambling for enhanced physical control channels.

BACKGROUND

In 3GPP Long Term Evolution (LTE) (3GPP LTE Rel-10), regardless of which transmission point (TP) a user equipment (UE) receives downlink (DL) data signals from, the UE would expect that UE-specific demodulation reference signals (UE-RS) are scrambled according to the physical cell ID $N_{ID}^{cell}$ obtained during the initial access procedure. According to this UE behavior, the UE may not be able to distinguish between a desired signal and interfering signals.

SUMMARY

A base station configured to communicate with a plurality of base stations via a backhaul link and configured to communicate with a plurality of user equipments is provided. The base station includes a transmit path configured to transmit data, reference signals, synchronization signals and control elements to at least one of the plurality of subscriber stations. The base station also includes processing circuitry configured to configure enhanced physical downlink control channel (e-PDCCH) DMRS parameters for each of a plurality of e-PDCCH sets.

A method for mapping synchronization signals is provided. The method includes transmitting data, reference signals, synchronization signals and control elements to at least one of the plurality of subscriber stations. The method also includes configuring enhanced physical downlink control channel (e-PDCCH) DMRS parameters for each of a plurality of e-PDCCH sets.

A subscriber station configured to communicate with at least one base station, which is configured to communicate with a plurality of base stations via a backhaul link, is provided. The subscriber station includes receiver configured to receive data, reference signals, synchronization signals and control elements from the base station. The subscriber station also includes processing circuitry configured to read physical resource blocks (PRBs) containing enhanced physical downlink control channel (e-PDCCH) downlink modulated reference signals (DMRS) parameters that have been configured for each of a plurality of e-PDCCH sets.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) 3GPP Technical Specification No. 36.211, version 10.1.0, "E-UTRA, Physical Channels and Modulation" (hereinafter "REF1"); (ii) 3GPP Technical Specification No. 36.212, version 10.1.0, "E-UTRA, Multiplexing and Channel Coding" (hereinafter "REF2"); (iii) 3GPP Technical Specification No. 36.213, version 10.1.0, "E-UTRA, Physical Layer Procedures" (hereinafter "REF3"); and (iv) 3GPP Technical Specification No. 36.331, version 10.1.0 (hereinafter "REF4").

Figure 1:
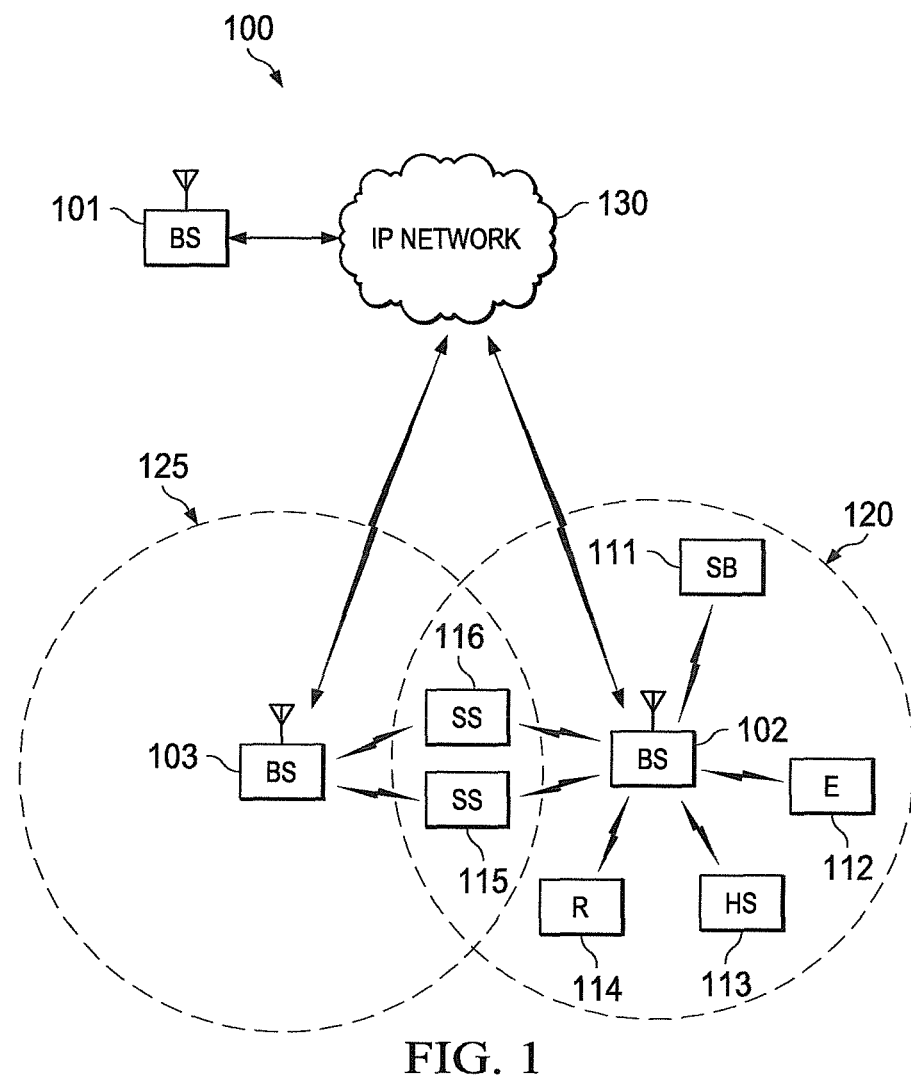
FIG. 1 illustrates a wireless network according to an embodiment of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals. In addition, the term user equipment (UE) is used herein to refer to remote terminals that can be used by a consumer to access services via the wireless communications network. Other well know terms for the remote terminals include "mobile stations" and "subscriber stations."

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

For the sake of convenience, the term "user equipment" or "UE" is used herein to designate any remote wireless equipment that wirelessly accesses an eNB, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 103 provides wireless broadband access to a second plurality of UEs within coverage area 125 of eNB 103. The second plurality of UEs includes UE 115 and UE 116. In some embodiment, one or more of eNBs 101-103 may communicate with each other and with UEs 111-116 using LTE or LTE-A techniques including techniques for: pilot scrambling for enhanced physical downlink control channels (e.g., e-PDCCH scrambling) described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

Figure 2A:
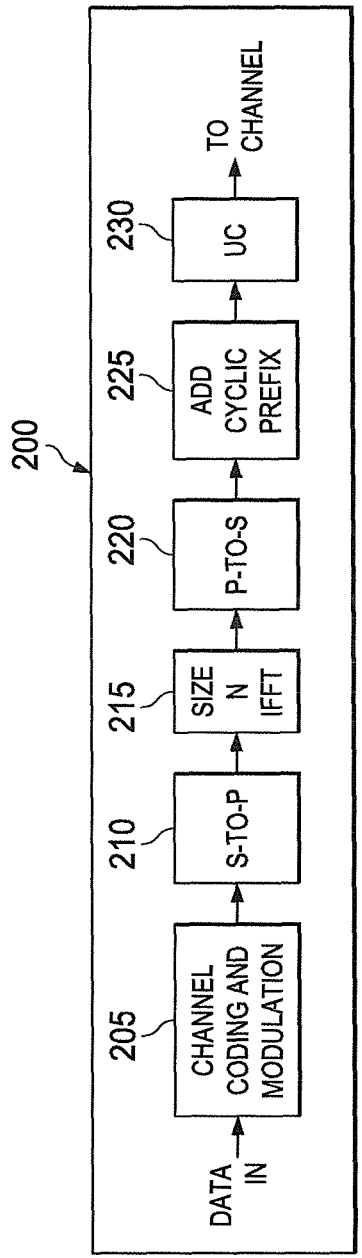
FIG. 2A illustrates a high-level diagram of a wireless transmit path according to an embodiment of this disclosure.
Figure 2B:
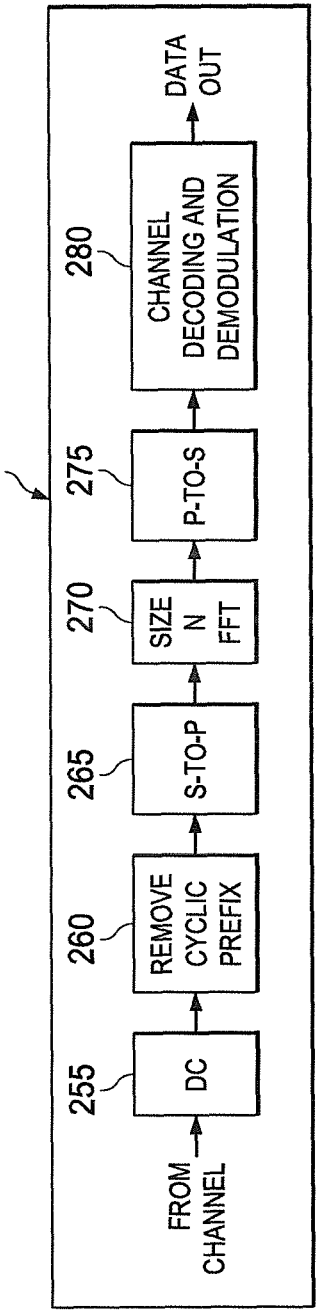
FIG. 2B illustrates a high-level diagram of a wireless receive path according to an embodiment of this disclosure.

FIG. 2A is a high-level diagram of a wireless transmit path. FIG. 2B is a high-level diagram of a wireless receive path. In FIGS. 2A and 2B, the transmit path 200 may be implemented, e.g., in eNB 102 and the receive path 250 may be implemented, e.g., in a UE, such as UE 116 of FIG. 1. It will be understood, however, that the receive path 250 could be implemented in an eNB (e.g. eNB 102 of FIG. 1) and the transmit path 200 could be implemented in a UE. In certain embodiments, transmit path 200 and receive path 250 are configured to perform methods for pilot scrambling for enhanced physical downlink control channels described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

Figure 3:
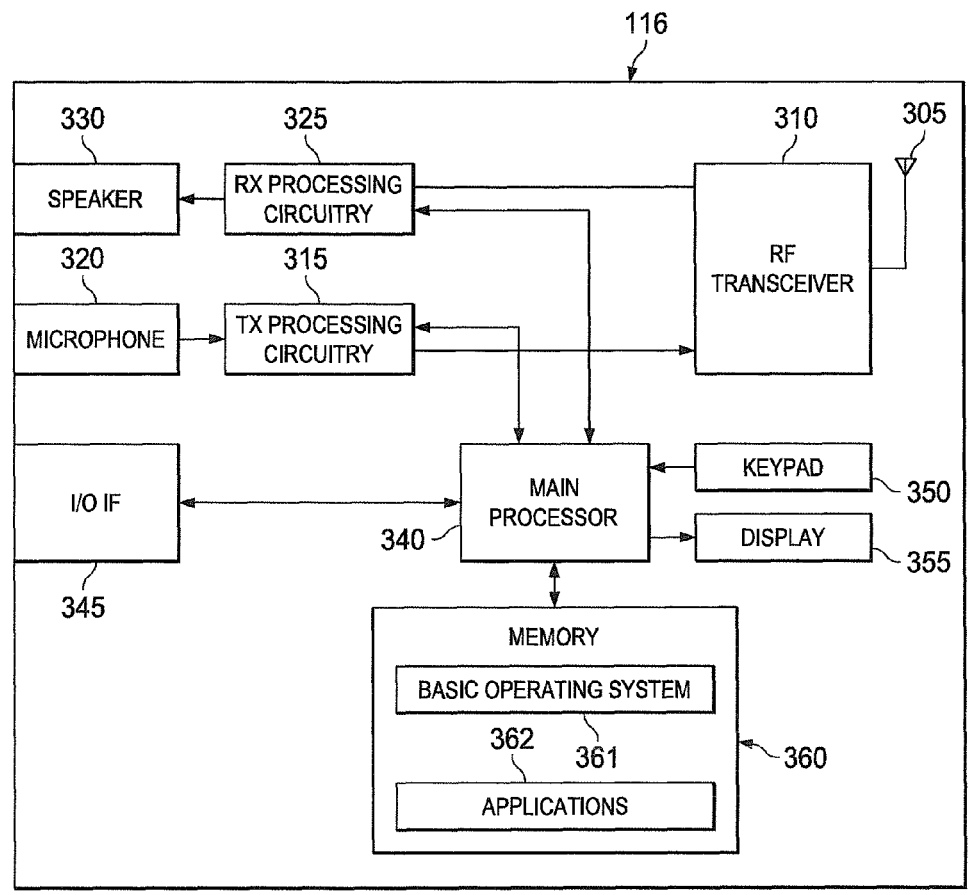
FIG. 3 illustrates a subscriber station according to an exemplary embodiment of the disclosure.

FIG. 3 illustrates a subscriber station according to embodiments of the present disclosure. The embodiment of subscribe station, such as UE 116, illustrated in FIG. 3 is for illustration only. Other embodiments of the wireless subscriber station could be used without departing from the scope of this disclosure.

UE 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for pilot scrambling for enhanced physical downlink control channels described in embodiments of the present disclosure. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Figure 4:
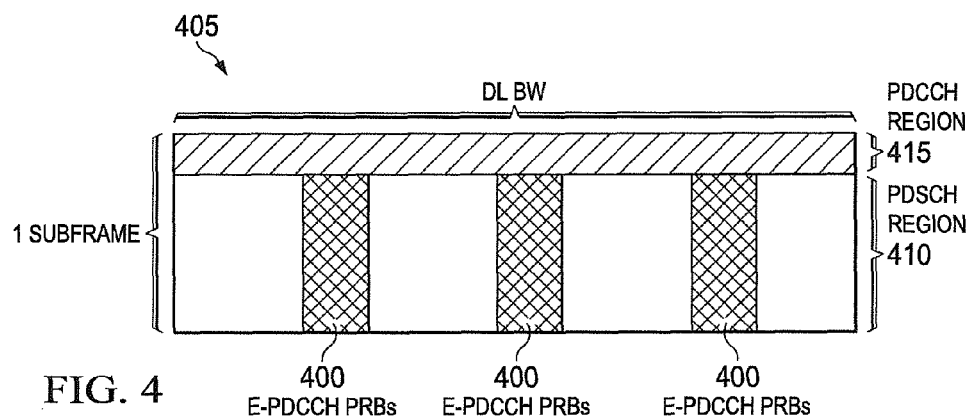
FIG. 4 illustrates an enhanced physical downlink control channel (e-PDCCH) according to embodiments of the present disclosure.

FIG. 4 illustrates an enhanced physical downlink control channel (e-PDCCH) according to embodiments of the present disclosure. The embodiment of the e-PDCCH resources 400 shown in FIG. 4 is for illustration only. Other embodiments could be used without departing from the scope of this disclosure.

A subframe 405 includes a physical downlink shared channel (PDSCH) 410 and a physical downlink control channel (PDCCH) 415. A number of e-PDCCH resources 400 are included in the PDSCH 410 region. The e-PDCCH resources 400 is included in the PDSCH 410 region for increasing DL control capacity within a cell and for mitigating inter-cell interference for DL control. The e-PDCCH resources 400 convey DL control signaling to Rel-11 UEs 300 configured to receive e-PDCCH.

Figure 5:
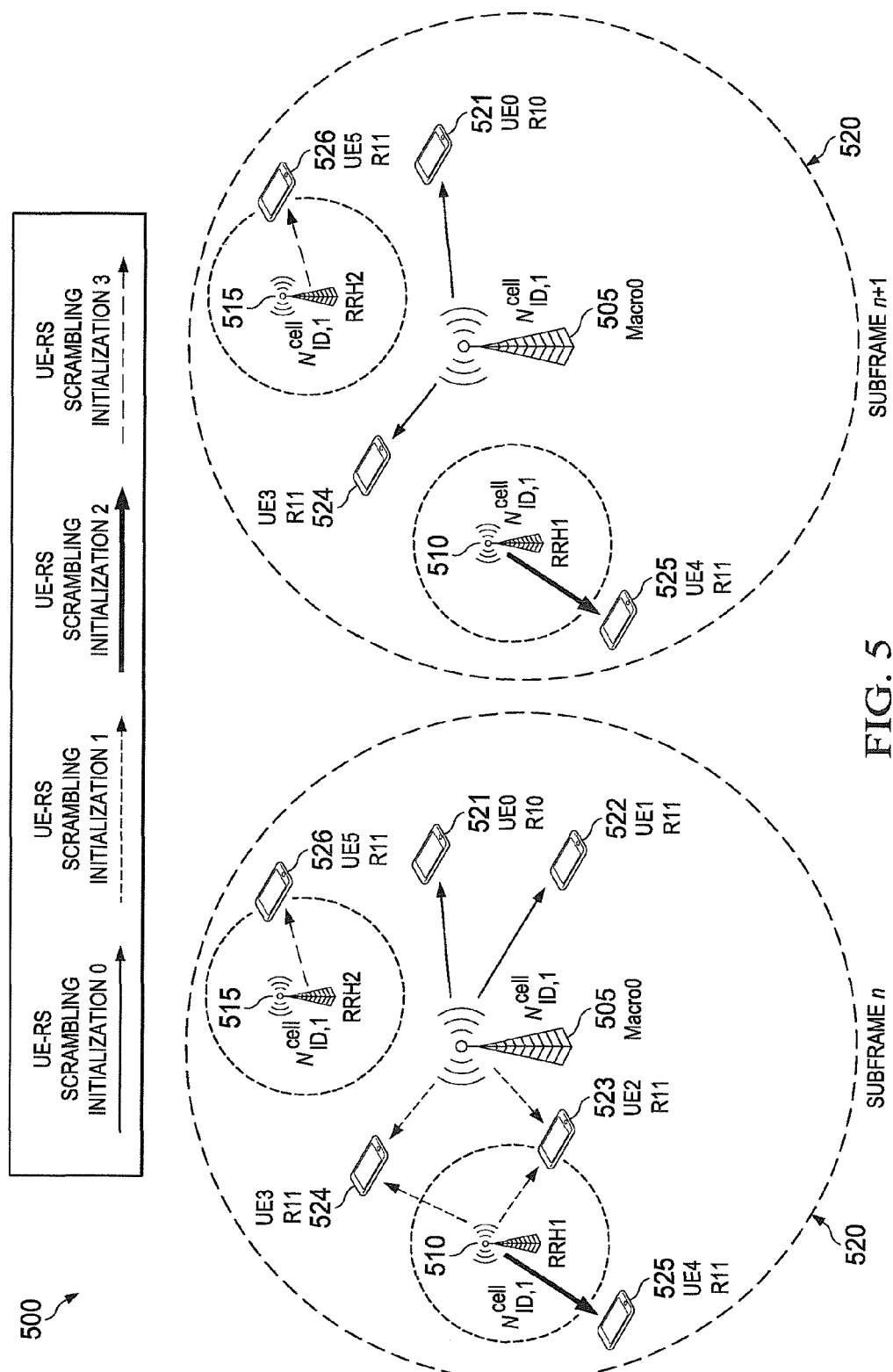
FIG. 5 illustrates downlink transmissions in a heterogeneous network according to embodiments of the present disclosure.

FIG. 5 illustrates downlink transmissions in a heterogeneous network according to embodiments of the present disclosure. The embodiment of the downlink transmissions 500 shown in FIG. 5 is for illustration only. Other embodiments could be used without departing from the scope of this disclosure.

In certain embodiments, an LTE-A Rel-11 coordinated multi-point (COMP) transmission/reception (a CoMP scenario commonly referred to "COMP scenario 4") includes a central controller that controls a number of transmission points (TPs) such as a macro 505 and remote radio heads (RRHs) 510, 515 in the macro coverage 520, and one physical cell ID $N_{ID}^{cell}$ is assigned to the macro and RRHs. According to the LTE specifications (3GPP LTE Rel-10), regardless of which TP a UE receives DL data signals from, the UE would expect that UE-specific demodulation reference signals (UE-RS) are scrambled according to the physical cell ID $N_{ID}^{cell}$ obtained during the initial access procedure.

The example in FIG. 5 illustrates downlink transmissions in subframes n and n+1 in a heterogeneous network. UE0 521 is a Rel-10 UE, while all the other UEs, UE1 522, UE2 523, UE3 524, UE4 525 and UE5 526 are Rel-11 UEs. In the network illustrated in FIG. 5, the following transmissions are happening in subframe n.

The network schedules the same PRBs for UE4 525 and UE5 526, where UE4 525 is positioned close to RRH1 510 and UE5 526 is positioned close to RRH2 515, which is far-away positioned from RRH1 510, in a subframe without worrying too much about the interference power. Furthermore, two UE-RS from RRH1 510 and RRH2 515 are not coherent combined at the receivers, with the aid of different UE-RS scrambling (initialization).

The network MU-MIMO multiplexes and assigns orthogonal UE-RS for Rel-11 UE1 522 and Rel-10 UE0 521, without affecting Rel-10 UE0's 521 demodulation performance.

The network MU-MIMO multiplexes and assigns orthogonal UE-RS for two Rel-11 UEs: UE2 523 and UE3 524.

Alternatively, in subframe n+1, UE1 522 and UE2 523 do not receive transmissions, e.g., because they completed data reception. Because of the UE population change, the following transmissions are happening in subframe n+1.

The network schedules the same PRBs for UE4 525 and UE5 526, where UE4 525 is positioned close to RRH1 510 and UE5 526 positioned close to RRH2 515 which is far-away positioned from RRH1 510, in a subframe without worrying too much about the interference power. Furthermore, two UE-RS from RRH1 510 and RRH2 515 are not coherent combined at the receivers, with the aid of different UE-RS scrambling (initialization).

The network MU-MIMO multiplexes and assigns orthogonal UE-RS for Rel-11 UE3 524 and Rel-10 UE0 521, without affecting Rel-10 UE0's demodulation performance.

In Section 6.10.3.1 of the 36.211 CR (R1-124010) the following is captured for the UE-RS scrambling:

For any of the antenna ports p∈{7, 8, ..., v+6}, the reference-signal sequence r(m) is defined by Equation 1:

$$r(m) = \frac{1}{\sqrt{2}}(1 - 2 \cdot c(2m)) + j\frac{1}{\sqrt{2}}(1 - 2 \cdot c(2m+1)), \quad [\text{EQn. 1}]$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

The pseudo-random sequence C(i) is defined in Section 7.2. The pseudo-random sequence generator is initialized according to Equation 2:

$$c_{init} = (\lfloor s/2 \rfloor + 1) \cdot (2n_{ID}^{(nSCID)} + 1) \cdot 2^{16} + n_{SCID} \quad [\text{Eqn. 2}]$$

at the start of each subframe. The quantities $n_{ID}^{(i)}$, i=0,1, are given by:

(1) $n_{ID}^{(i)} = n_{ID}^{cell}$ if no value for $n_{ID}^{DMRS,i}$ is provided by higher layers or if DCI format 1A is used for the DCI associated with the PDSCH transmission; and (2) $n_{id}^{(i)} = n_{ID}^{DMRS,i}$ otherwise.

The value of $n_{SCID}$ is zero unless specified otherwise. For a PDSCH transmission on ports 7 or 8, $n_{SCID}$ is given by the DCI format 2B or 2C associated with the PDSCH transmission. In the case of DCI format 2B, $n_{SCID}$ is indicated by the scrambling identity field according to Table 6.10.3.1-1. In the case of DCI format 2C, $n_{SCID}$ is given by Table 5.3.3.1.5C-1 in REF3.

TABLE 6.10.3.1-1

Mapping of scrambling identity field in DCI format 2B to $n_{SCID}$ values for antenna ports 7 and 8.

| Scrambling identity field in DCI format 2B | $n_{SCID}$ |
|---|---|
| 0 | 0 |
| 1 | 1 |

Demodulation reference signals associated with e-PDCCH:

In Section 6.10.3A.1 of the 36.211 CR (R1-124010) the following is captured for the downlink modulated reference signals (DMRS) associated with e-PDCCH:

The demodulation reference signal associated with e-PDCCH:

is transmitted on the same antenna port p∈{107,108,109, 110} as the associated EPDCCH physical resource;

is present and is a valid reference for e-PDCCH demodulation only if the EPDCCH transmission is associated with the corresponding antenna port; and is transmitted only on the physical resource blocks upon which the corresponding EPDCCH is mapped.

A demodulation reference signal associated with e-PDCCH is not transmitted in resource elements (k,l) in which one of the physical channels or physical signals other than the demodulation reference signals defined in 6.1 are transmitted using resource elements with the same index pair (k,l) regardless of their antenna port p.

For any of the antenna ports p∈{107,108,109,110}, the reference-signal sequence r(m) is defined by Equation 3:

$$r(m) = \frac{1}{\sqrt{2}}(1 - 2 \cdot c(2m)) + j\frac{1}{\sqrt{2}}(1 - 2 \cdot c(2m+1)), \quad [\text{Eqn. 3}]$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

The pseudo-random sequence C(1) is defined in Section 7.2. The pseudo-random sequence generator shall be initialized with Equation 4:

$$c_{init} = (\lfloor n_s/2 \rfloor + 1) \cdot (2n_{ID}^{EPDCCH} + 1) \cdot 2^{16} + n_{SCID}^{EPDCCH} \quad [\text{Eqn. 4}]$$

at the start of each subframe.

For the antenna port p∈{107,108,109,110} in a physical resource block $n_{PRB}$ assigned for the associated EPDCCH, a part of the reference signal sequence r(m) is mapped to complex-valued modulation symbols $a_{k,l}^{(p)}$ in a subframe according to normal cyclic prefix:

$$a_{k,l}^{(p)} = w_p(l') \cdot r(3 \cdot l' \cdot N_{RB}^{max,DL} + 3 \cdot n_{PRB} + m') \quad [\text{Eqn 5}]$$

where $$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{107, 108\} \\ 0 & p \in \{109, 110\} \end{cases}$$

$$l = \begin{cases} l' \bmod 2 + 2 & \text{if in a } \textit{specialsubframe with } \text{configuration} \\ & 3, 4, \text{ or } 8 (\textit{seeTable}4.2\text{-}1) \\ l' \bmod 2 + & \text{if in a } \textit{specialsubframe with } \text{configuration} \\ 2 + 3\lfloor l'/2 \rfloor & 1, 2, 6, \text{ or } 7 (\textit{seeTable}4.2\text{-}1) \\ l' \bmod 2 + 5 & \text{if not in a } \textit{specialsubframe} \end{cases}$$

$$l' = \begin{cases} 0, 1, 2, 3 & \text{if } n_s \bmod 2 = 0 \text{ and in a } \textit{specialsubframe with} \\ & \text{configuration } 1, 2, 6, \text{ or } 7 (\textit{seeTable}4.2\text{-}1) \\ 0, 1 & \text{if } n_s \bmod 2 = 0 \text{ and not in } \textit{specialsubframe with} \\ & \text{configuration } 1, 2, 6, \text{ or } 7 (\textit{seeTable}4.2\text{-}1) \\ 2, 3 & \text{if } n_s \bmod 2 = 1 \text{ and not in } \textit{specialsubframe with} \\ & \text{configuration } 1, 2, 6, \text{ or } 7 (\textit{seeTable}4.2\text{-}1) \end{cases}$$

$$m' = 0, 1, 2$$

The sequence $\bar{w}_p(i)$ is given by Table 6.10.3A.2-1.

TABLE 6.10.3A.2-1

The sequence $\bar{w}_p(i)$ for normal cyclic prefix.

| Antenna port p | $[\bar{w}_p(0)\ \bar{w}_p(1)\ \bar{w}_p(2)\ \bar{w}_p(3)]$ |
|---|---|
| 107 | [+1 +1 +1 +1] |
| 108 | [+1 −1 +1 −1] |
| 109 | [+1 +1 +1 +1] |
| 110 | [+1 −1 +1 −1] |

Extended Cyclic Prefix:

$$a_{k,l}^{(p)} = w_p(l' \bmod 2) \cdot r(4 \cdot l' \cdot N_{RB}^{max,DL} + 4 \cdot n_{PRB} + m') \quad [\text{Eqn 6}]$$

where $$w_p(i) = \begin{cases} \bar{w}_p(i) & m' \bmod 2 = 0 \\ \bar{w}_p(3-i) & m' \bmod 2 = 1 \end{cases}$$

$$k = 3m' + N_{sc}^{RB} n_{PRB} + k'$$

$$k' = \begin{cases} 1 & \text{if } n_s \bmod 2 = 0 \text{ and } p \in \{107, 108\} \\ 0 & \text{if } n_s \bmod 2 = 1 \text{ and } p \in \{109, 108\} \end{cases}$$

$$l = l' \bmod 2 + 4$$

$$l' = \begin{cases} 0, 1 & \text{if } n_s \bmod 2 = 0 \text{ and in a special subframe with} \\ & \text{configuration } 1, 2, 3, 5, \text{ or } 6 (\text{see Table } 4.2\text{-}1) \\ 0, 1 & \text{if } n_s \bmod 2 = 0 \text{ and not in special subframe} \\ 2, 3 & \text{if } n_s \bmod 2 = 1 \text{ and not in special subframe} \end{cases}$$

$$m' = 0, 1, 2, 3$$

The sequence $\bar{w}_p(i)$ is given by Table 6.10.3A.2-2.

TABLE 6.10.3A.2-2

The sequence $\bar{w}_p(i)$ for extended cyclic prefix.

| Antenna port p | $[\bar{w}_p(0)\ \bar{w}_p(1)]$ |
|---|---|
| 107 | [+1 +1] |
| 108 | [−1 +1] |

For extended cyclic prefix, demodulation reference signals are not supported on antenna ports 109 to 110.

Resource elements (k,l) used for transmission of demodulation reference signals to one UE on any of the antenna ports in the set S, where S={107,108} or S={109,110} are:

not used for transmission of EPDCCH on any antenna port in the same slot, and not used for demodulation reference signals to the same UE on any antenna port other than those in S in the same slot.

Replacing antenna port numbers 7-10 by 107-110 (in REF3, FIG. 6.10.3.2-3) provides an illustration of the resource elements used for demodulation reference signals associated with e-PDCCH for normal cyclic prefix. Replacing antenna port numbers 7-8 by 107-108 (in REF3, FIG. 6.10.3.2-4) provides an illustration of the resource elements used for demodulation reference signals associated with e-PDCCH for extended cyclic prefix.

In certain embodiments, an e-PDCCH set is defined as a group of N PRB pairs

N={1 for localized (FFS), 2, 4, 8, 16 for distributed (FFS), ...}

A distributed e-PDCCH is transmitted using the N PRB pairs in an e-PDCCH set

A localized e-PDCCH is transmitted within an e-PDCCH set a localized e-PDCCH can be transmitted across more than one PRB pair K≥1 e-PDCCH sets are configured in a UE specific manner:

Maximum number for K is selected later among 2, 3, 4, and 6

The K sets do not have to all have the same value of N

The total number of blind decoding attempts is independent from K

The total blind decoding attempts for a UE should be split into configured K e-PDCCH sets Each e-PDCCH set is configured for either localized e-PDCCH or distributed e-PDCCH The K sets consist of $K_L$ sets for localized e-PDCCH and $K_D$ sets for distributed e-PDCCH (where $K_L$ or $K_D$ can be equal to 0), and not all combinations of KL and KD are necessarily supported for each possible value of K.

PRB pairs of e-PDCCH sets with different logical e-PDCCH set indices can be fully overlapped, partially overlapped, or non-overlapping.

This is captured in the CR 36.213 (R1-124012) as in the following:

9.1.4 e-PDCCH assignment procedure

For each serving cell, higher layer signalling can configure a UE with one or multiple e-PDCCH-PRB-sets for e-PDCCH monitoring. Each e-PDCCH-PRB-set consists of set of ECCEs numbered from 0 to $N_{ECCE,p,k}-1$ where $N_{ECCE,p,k}$ is the number of ECCEs in e-PDCCH-PRB-set p of subframe k.

Each e-PDCCH-PRB-set can be configured for either localized e-PDCCH transmission or distributed e-PDCCH transmission.

The UE monitors a set of e-PDCCH candidates on one or more activated serving cells as configured by higher layer signalling for control information. Monitoring implies attempting to decode each of the e-PDCCHs in the set according to the monitored DCI formats.

The set of e-PDCCH candidates to monitor are defined in terms of e-PDCCH UE-specific search spaces.

For each serving cell, the subframes in which the UE monitors e-PDCCH UE-specific search spaces are configured by higher layers.

For TDD and normal downlink CP, the UE is not expected to monitor e-PDCCH in special subframes for the special subframe configurations 0 and 5 shown in Table 4.2-1 of REF3.

For TDD and extended downlink CP, the UE is not expected to monitor e-PDCCH in special subframes for the special subframe configurations 0, 4 and 7 shown in Table 4.2-1 of REF3.

A UE is not expected to monitor an e-PDCCH candidate, if an ECCE corresponding to that e-PDCCH candidate is mapped to a PRB pair that overlaps in frequency with a transmission of either PBCH or primary or secondary synchronisation signals in the same subframe.

The definition of quasi co-location of antenna ports is as below.

A port (Port A) is considered to be quasi co-located with another port (Port B) if the UE is allowed to derive the "large scale properties" of Port A, e.g. needed for channel estimation/time-frequency synchronization based on Port A, from measurement on Port B. The large scale channel properties are for e.g.: Delay spread; Doppler spread; Frequency shift; Average received power (may only be needed between ports of the same type); and Received Timing.

Another alternative definition of quasi co-location of antenna ports is as follows: "If two antenna ports are 'quasi co-located', the UE may assume that large-scale properties of the channel over which a symbol on one antenna port is conveyed can be inferred from the channel over which a symbol on the other antenna port is conveyed".

The "large-scale properties" mentioned in the above definition consist of some or all of: Delay spread; Doppler spread; Doppler shift; Average gain; and Average delay.

For clarification and only for the purpose of definition of quasi co-location channel properties: the term channel in the above definition includes all the effects and transformations occurring after the corresponding antenna port as defined in TS 36.211, including impairments and non-idealities of the radio equipment from eNB; antenna ports can be assumed to be ideally synchronized in time and frequency; non-idealities in the RF chain as well as network's intended control of tx delay, tx frequency shift and tx power difference of the transmit signal as compared to the nominal value are included in the channel model.

A UE can be configured with one or more NZP CSI-RS resources e.g. as follows:

---

CSI-RS resource config list {
    CSI-RS resource config x {
        CSI-RS resource id
        CSI-RS virtual cell id
        Non zero-power CSI-RS resource config
        Non zero-power CSI-RS subframe config
        ...
    }

---

To increase the network throughput and implementation/scheduling flexibility, the network is configured to efficiently support these diverse and dynamically changing transmission schemes. To facilitate this diverse and dynamic operation, a control signaling design is utilized for advanced (or Rel-11) UEs.

Figure 6:
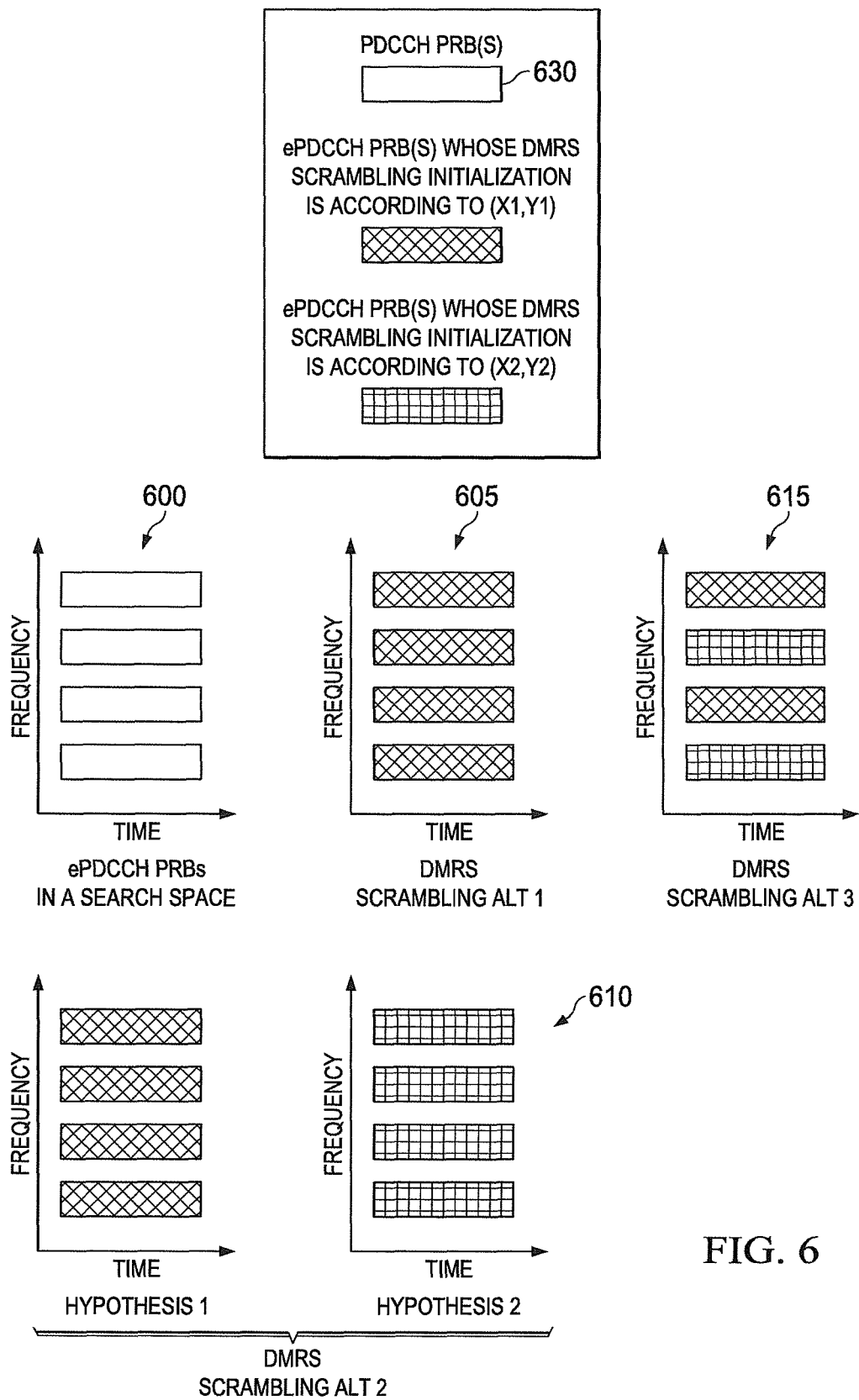
FIG. 6 illustrates an e-PDCCH downlink modulated reference signal (DMRS) scrambling method according to embodiments of the present disclosure.

FIG. 6 illustrates an e-PDCCH downlink modulated reference signal (DMRS) scrambling method according to embodiments of the present disclosure. The embodiment of the e-PDCCH DMRS scrambling method 600 shown in FIG. 6 is for illustration only. Other embodiments could be used without departing from the scope of this disclosure.

In one example, UE 116 generates demodulation reference signals (DM-RS) scrambling initialization according to Equation 7:

$$c_{init}=(\lfloor n_s/2 \rfloor+1)\cdot(2X+1)\cdot 2^{16}+Y \qquad [\text{Eqn. 7}],$$

where at least one of X and Y is dynamically configured by a downlink grant DCI format transmitted in PDCCH. Some example methods to semi-statically configure candidate sets for X and Y are listed below:

RRC configures a single value of X, and N candidate values of Y. The downlink grant DCI format indicates one Y out of the N candidate values of Y.

In one example, X=physical cell ID of the serving cell.

RRC configures a single value of Y, and N candidate values of X. The downlink grant DCI format indicates one X out of the N candidate values of X.

RRC configures N candidate pairs of (X,Y). The downlink grant DCI format indicates one pair of (X,Y) out of the N candidate pairs.

RRC configures N1 candidate values of X, and N2 candidate values of Y. The downlink grant DCI format indicates one X out of the N1 candidate values of X, and one Y out of the N2 candidate values of Y.

UE 116 derives candidate values of X and/or Y from CSI-RS configurations (or configured CSI-RS parameters, e.g., periodicity, subframe offset, CSI-RS configuration number).

Embodiments of the present disclosure illustrate methods of configuring DMRS scrambling initializations in e-PDCCH physical resource blocks (PRBs) in an e-PDCCH search space.

In certain embodiments (referenced as Method 1): DMRS scrambling initializations for the e-PDCCH PREs is performed according to an initialization equation, such as Equation 8:

$$c_{init}=(\lfloor n_s/2 \rfloor+1)\cdot(2N_{ID}^{cell}+1)\cdot 2^{16}+n_{SCID} \qquad [\text{Eqn. 8}].$$

Here, UE 116 obtains $n_{SCID}$ value for the DMRS channel estimation, according to one of the following alternatives.

In a first alternative (referenced as Alt 1): an $n_{SCID}$ value is fixed in the standard specification. For example, $n_{SCID}=0$, in which case all the UEs will assume that the e-PDCCH DMRS in all the e-PDCCH PRBs in the search space 600 are scrambled with an Equation 8 initialization with $n_{SCID}=0$.

In a second alternative (referenced as Alt 2): an $n_{SCID}$ value is (UE-specifically) configured by RRC. For example, when UE 116 is configured with $n_{SCID}=Y$, UE 116 assumes that the e-PDCCH DMRS in all the e-PDCCH PRBs in the search space 600 are scrambled with the legacy initialization with $n_{SCID}=Y$.

In certain embodiments (referenced as Method 2):DMRS scrambling initialization for the e-PDCCH PRBs are done according to the new initialization equation, such as Equation 9:

$$c_{init}=(\lfloor n_s/2 \rfloor+1)\cdot(2X+1)\cdot 2^{16}+Y \qquad [\text{Eqn. 9}].$$

Here, UE 116 obtains (X,Y) for the DMRS channel estimation, according to one of the following alternatives:

In a first DMRS scrambling alternative 605 (referenced as Alt 1): (Common (X,Y)), in all the e-PDCCH PRBs 630 in the search space 600, the scrambling initialization value is generated according to a single pair of (X,Y). Hence, UE 116 only needs to know the single pair of (X,Y) for DMRS channel estimation. The single pair of (X,Y) can be RRC configured.

In a second DMRS scrambling alternative 610 (referenced as Alt 2):(Multiple hypothesis on (X,Y)), in all the e-PDCCH PRBs 630 in the search space 600, the scrambling initialization value is generated according to one of N pairs of (X,Y), where N is an integer >1. In this case, a subset of the N pairs of (X,Y) is signaled to each UE, so that the UE can try each of the pairs of (X,Y) in the subset for DMRS channel estimation and e-PDCCH demodulation. The second DMRS scrambling alternative 610 illustrates the case where UE 116 is instructed to use two candidate pairs of (X,Y) for e-PDCCH DMRS channel estimation, in which case, UE 116 tries to estimate the channels (and demodulate e-PDCCH) according to each of the two hypothesis of (X,Y). The multiple pairs of (X,Y) can be RRC configured.

In a third DMRS scrambling alternative 615 (referenced as Alt 3): (Varying (X,Y)'s across PRBs), the scrambling initialization values may change over different e-PDCCH PRBs in the search space 600. In this case, UE 116 is informed (e.g., RRC configured) of a scrambling initialization mapping pattern across the e-PDCCH PRBs in the search space 600, and uses the mapping pattern for DMRS channel estimation and e-PDCCH demodulation.

Furthermore, in some embodiments, UE 116 is implicitly signaled of the DMRS scrambling initialization for a data channel, i.e., a PDSCH/PUSCH by means of a DMRS scrambling initialization used for the e-PDCCH DL/UL grant scheduling the PDSCH/PUSCH. That is, when UE 116 detects a DL/UL grant from an e-PDCCH whose DMRS scrambling initialization is (X,Y), then the same (X,Y) are used for DMRS scrambling for the PDSCH/PUSCH scheduled by the DL/UL grant.

Figure 7:
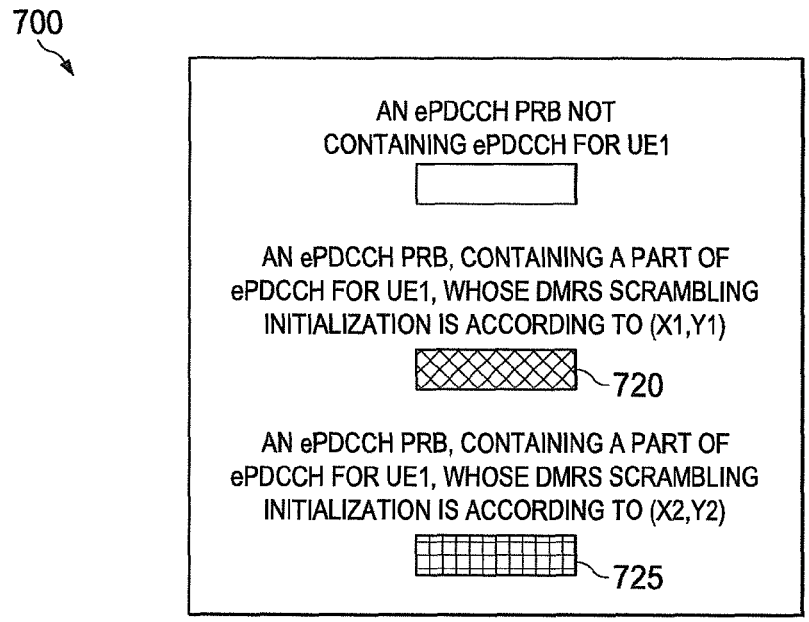
FIG. 7 illustrates example e-PDCCH transmissions according to embodiments of the present disclosure.
Figure 7:
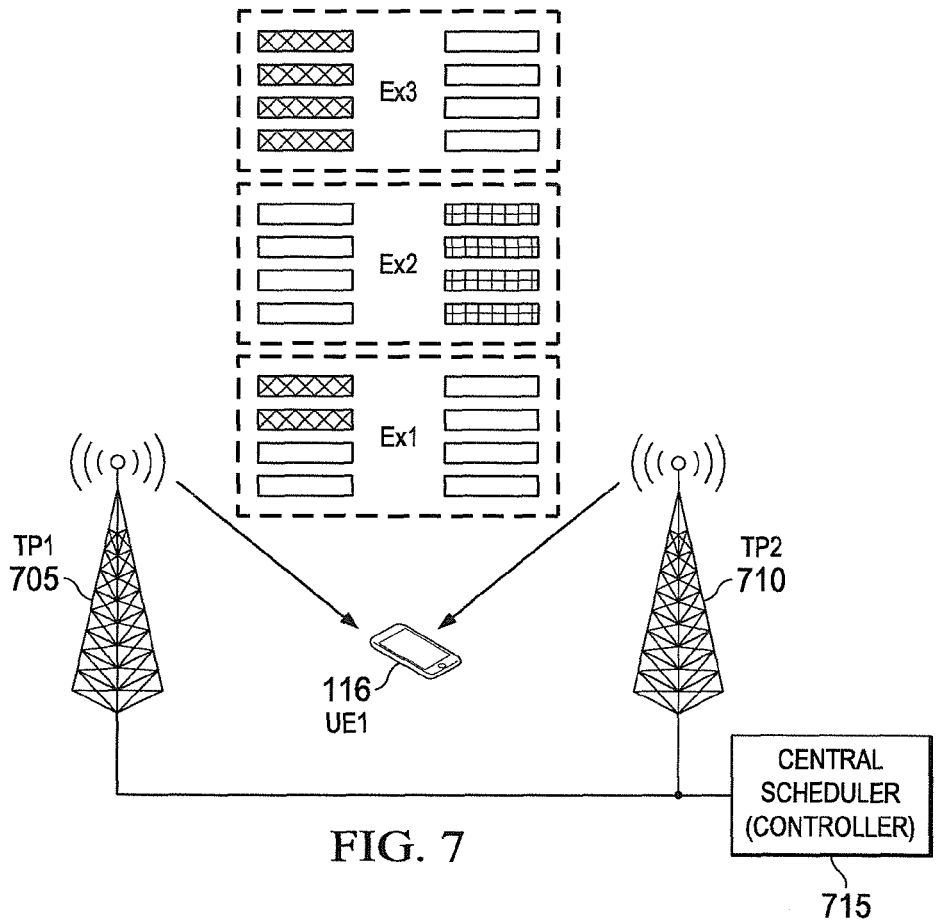

FIG. 7 illustrates example e-PDCCH transmissions according to Method 2, Alt 2. The embodiment of the e-PDCCH transmissions 700 shown in FIG. 7 is for illustration only. Other embodiments could be used without departing from the scope of this disclosure.

In the example shown in FIG. 7, three example e-PDCCH transmissions from one of the two transmission points (TPs) 705, 710 are illustrated.

In a first example (Ex1), an e-PDCCH (or a DCI) for UE 116 is transmitted across two PRBs, where the two PRBs' DMRS are scrambled according to (X1, Y1) 720, and transmitted from TP1 705.

In a second example (Ex2), an e-PDCCH (or a DCI) for UE 116 is transmitted across four PRBs, where the four PRBs' DMRS are scrambled according to (X2, Y2) 725, and transmitted from TP2 710.

In a third example (Ex3), an e-PDCCH (or a DCI) for UE 116 is transmitted across four PRBs, where the four PRBs' DMRS are scrambled according to (X1, Y1) 720, and transmitted from TP1 705.

The number of PRBs used for transmitting an e-PDCCH can be any integer, and the numbers of PRBs used in the examples are just for illustration. Furthermore, multiple e-PDCCHs can be multiplexed in the same set of PRBs. For example, the two PRBs carrying e-PDCCH for UE1 116 in Ex1 may also carry another e-PDCCH for another UE, e.g., UE2 (such as UE 115 shown on FIG. 1); the two e-PDCCHs are multiplexed, such as by one of: TDM, FDM, TDM/FDM and CDM.

In certain embodiments, the eNodeB can perform dynamic TP selection for e-PDCCH transmissions. In some cases, TP1 705 and TP2 710 are controlled by a common central scheduler 715, which determines which TP to transmit an e-PDCCH to individual UEs. For example, when the channel between TP1 705 and UE 116 is stronger than TP2 710 and UE 116, eNodeB central controller 715 can decide to transmit e-PDCCH through the link between TP1 705 and UE 116 (according to Ex1 or Ex2).

Figure 8:
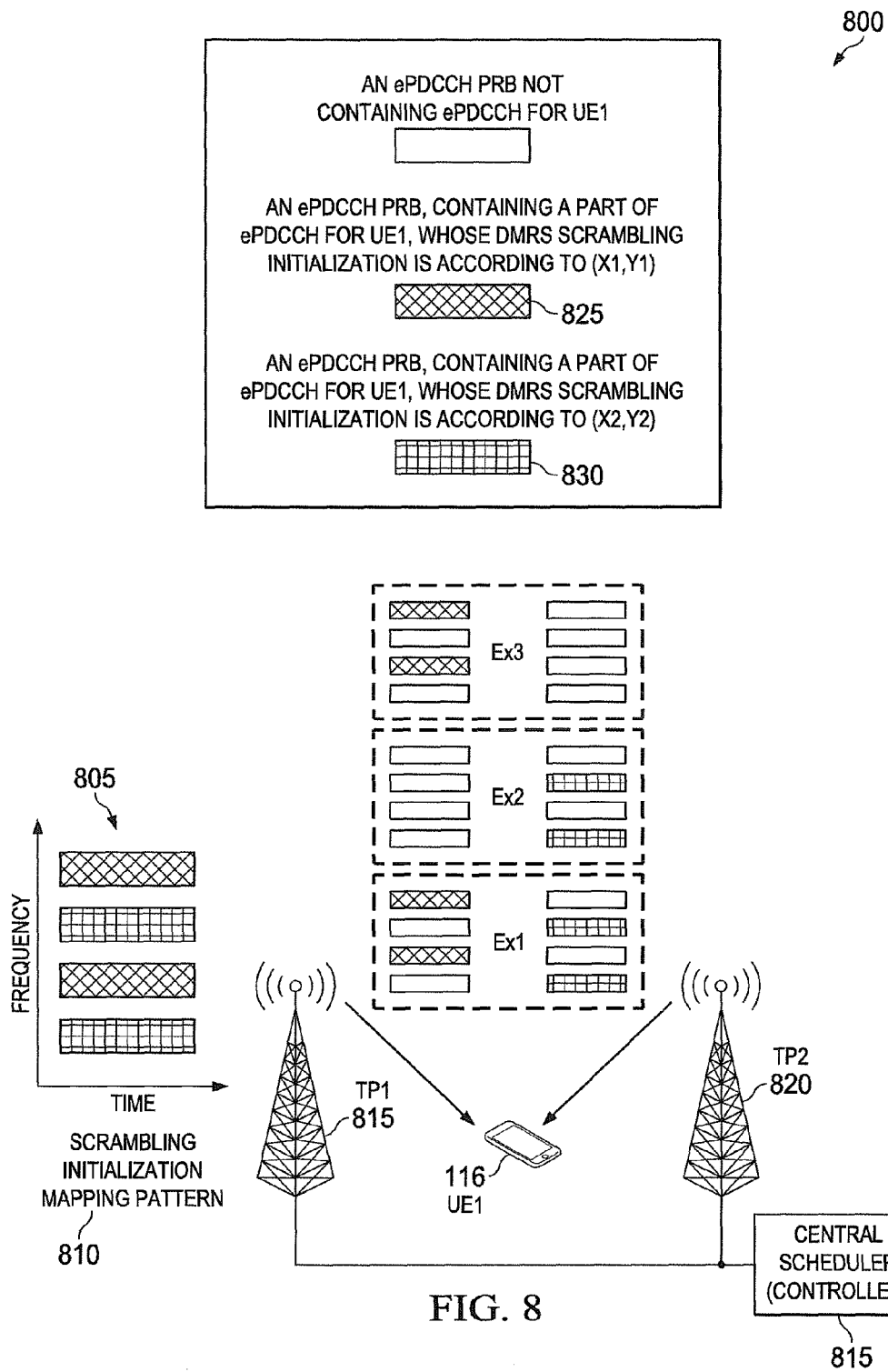
FIG. 8 illustrates example e-PDCCH transmissions according to embodiments of the present disclosure.

FIG. 8 illustrates example e-PDCCH transmissions according to Method 2, Alt 3. The embodiment of the e-PDCCH transmissions 800 shown in FIG. 8 is for illustration only.

Other embodiments could be used without departing from the scope of this disclosure.

In the example shown in FIG. 8, an example of e-PDCCH transmissions according to Alt 3 is illustrated. On the left side of FIG. 8, an example e-PDCCH search space 805 and the scrambling initialization pattern 810 are shown. The right side of FIG. 8 shows three example e-PDCCH transmissions from at least one of the two transmission points (TPs) 815, 820.

In Ex1, an e-PDCCH (or a DCI) for UE 116 is transmitted across four PRBs, where two PRBs' DMRS are scrambled according to (X1, Y1) 825 and the other two PRBs' DMRS are scrambled according to (X2, Y2) 830. The PRBs scrambled according to (X1, Y1) 825 are transmitted from TP1 815, and the PRBs scrambled according to (X2,Y2) 830 are transmitted from TP2 820. However it is also possible that all the four PRBs are transmitted from one TP, i.e., either from TP1 815 or TP2 820.

In Ext, an ePDCCH for UE 116 is transmitted across two PRBs, where the two PRBs are scrambled according to (X2, Y2) 830. The two PRBs are transmitted from either TP1 815 or TP2 820.

In Ex3, an e-PDCCH for UE 116 is transmitted across two PRBs, where the two PRBs are scrambled according to (X1, Y1) 825 and transmitted from TP1 815. The two PRBs are transmitted from either TP1 815 or TP2 820.

In the examples shown in FIG. 8, e-PDCCH DMRS scrambling initialization is PRB-specifically performed according to the scrambling initialization pattern. The eNodeB can perform dynamic TP selection for e-PDCCH transmissions. For example, when the channel between TP1 815 and UE 116 is stronger than TP2 820 and UE 116, eNodeB central scheduler 825 can decide to transmit e-PDCCH through the link between TP1 815 and UE 116 (according to Ex3). Alternatively, Ex1 is essentially a spatial diversity transmission, which can help UE 116 to reliably receive the e-PDCCH even if no good CSIs are available (e.g., due to medium to high mobility).

Certain embodiments illustrate methods to efficiently utilize the e-PDCCH resources by allowing the MU-MIMO and/or the CoMP DPS for e-PDCCH.

In a third method (Method 3), e-PDCCH DMRS configuration parameter(s) are independently configurable for each e-PDCCH PRB set. In this case, the pseudo-random sequence generator for the DMRS of a PRB in e-PDCCH PRB set k is initialized according to Equation 10:

$$c_{init} = (\lfloor n_s/2 \rfloor + 1) \cdot (2n_{ID}^{EPDCCH}(k) + 1) \cdot 2^{16} + n_{SCID}^{EPDCCH}(k)$$ [Eqn. 10]

The pseudo-random sequence generator for the DMRS of a PRB in e-PDCCH PRB set k is initialized at the start of each subframe, where $(n_{ID}^{EPDCCH}(k), n_{SCID}^{EPDCCH}(k))$ is higher-layer (RRC) configured for k=0, 1, ..., K−1 and K is the total number of the e-PDCCH PRB sets. In some embodiments, $n_{SCID}^{EPDCCH}(k)$ is fixed as a constant (e.g., $n_{SCID}^{EPDCCH}(k)=0$ for all k) and hence it does not need to be signaled to UE 116.

Two alternatives are considered for configuring the K pairs of e-PDCCH DMRS parameters:

In a first alternative of method 3 (referenced as Method 3, Alt 1): the K pairs of e-PDCCH DMRS parameters are independently RRC configured. This alternative has an advantage of being fully flexible in choosing the e-PDCCH DMRS parameters.

In a second alternative of method 3 (referenced as Method 3, Alt 2): a PDSCH UE-RS scrambling ID (i=0,1) is configured for each of the K pairs of e-PDCCH DMRS parameters. When the PDSCH UE-RS scrambling ID configured for set k is i, then, $(n_{ID}^{EPDCCH}(k)=n_{ID}^{DMRS,i}, n_{SCID}^{EPDCCH}(k)=i)$ is used for the e-PDCCH scrambling. Here, $n_{ID}^{DMRS,i}$ is the i-th virtual cell ID associated with scrambling ID i, configured in the higher layer for PDSCH UE-RS. This alternative has an advantage of reducing RRC signaling overhead.

Figure 9:
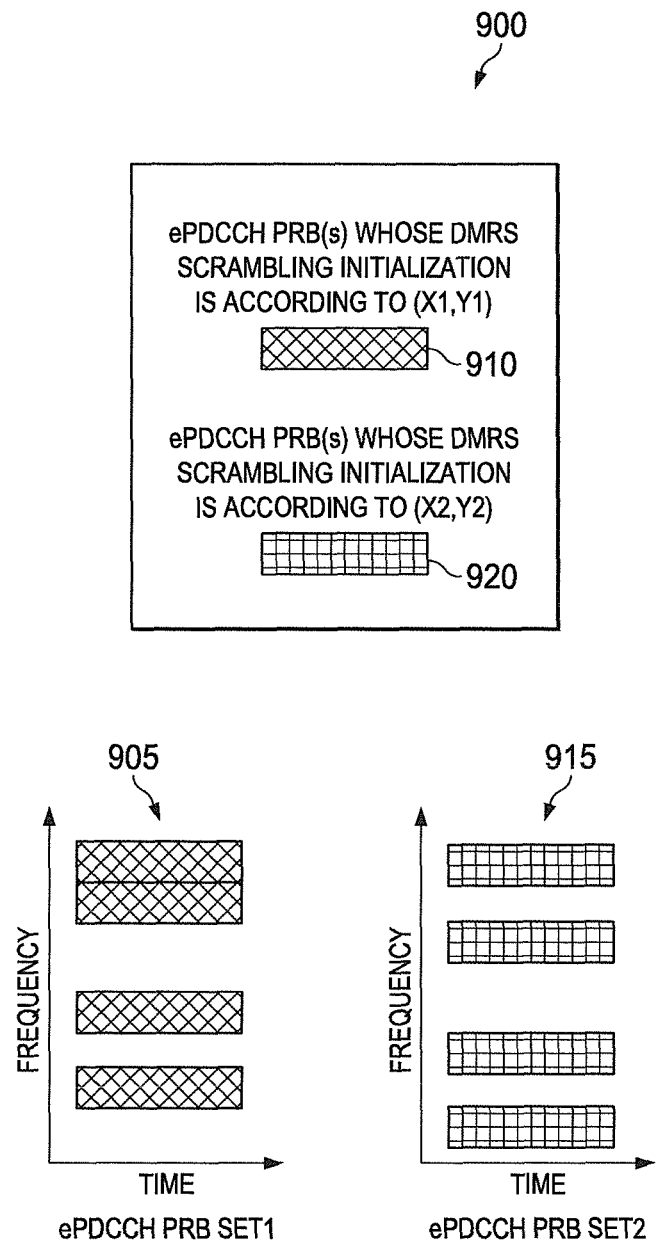
FIG. 9 illustrates another e-PDCCH downlink modulated reference signal (DMRS) scrambling method according to embodiments of the present disclosure.

FIG. 9 illustrates another e-PDCCH downlink modulated reference signal (DMRS) scrambling method according to embodiments of the present disclosure. The embodiment of the e-PDCCH DMRS scrambling method 900 shown in FIG. 9 is for illustration only. Other embodiments could be used without departing from the scope of this disclosure.

In FIG. 9, K=2 ePDCCH PRB sets are assigned to UE 116, where each e-PDCCH PRB set is composed of N=4 PRB pairs. Each set of the e-PDCCH PRBs are configured with different e-PDCCH DMRS configuration parameters; the first e-PDCCH set 905 is configured with (X1, Y1) 910 and the second e-PDCCH set 915 is configured with (X2, Y2) 920. Then, the DMRS scrambling initialization for the e-PDCCH PRBs are done according to initialization Equation 11, with substituting (Xi, Yi) with $(n_{ID}^{EPDCCH}, n_{SCID}^{EPDCCH})$:

$$c_{init}=(\lfloor n_s/2 \rfloor+1)\cdot(2n_{ID}^{EPDCCH}+1)\cdot 2^{16}+n_{SCID}^{EPDCCH} \quad [\text{Eqn.11}].$$

Figure 10:
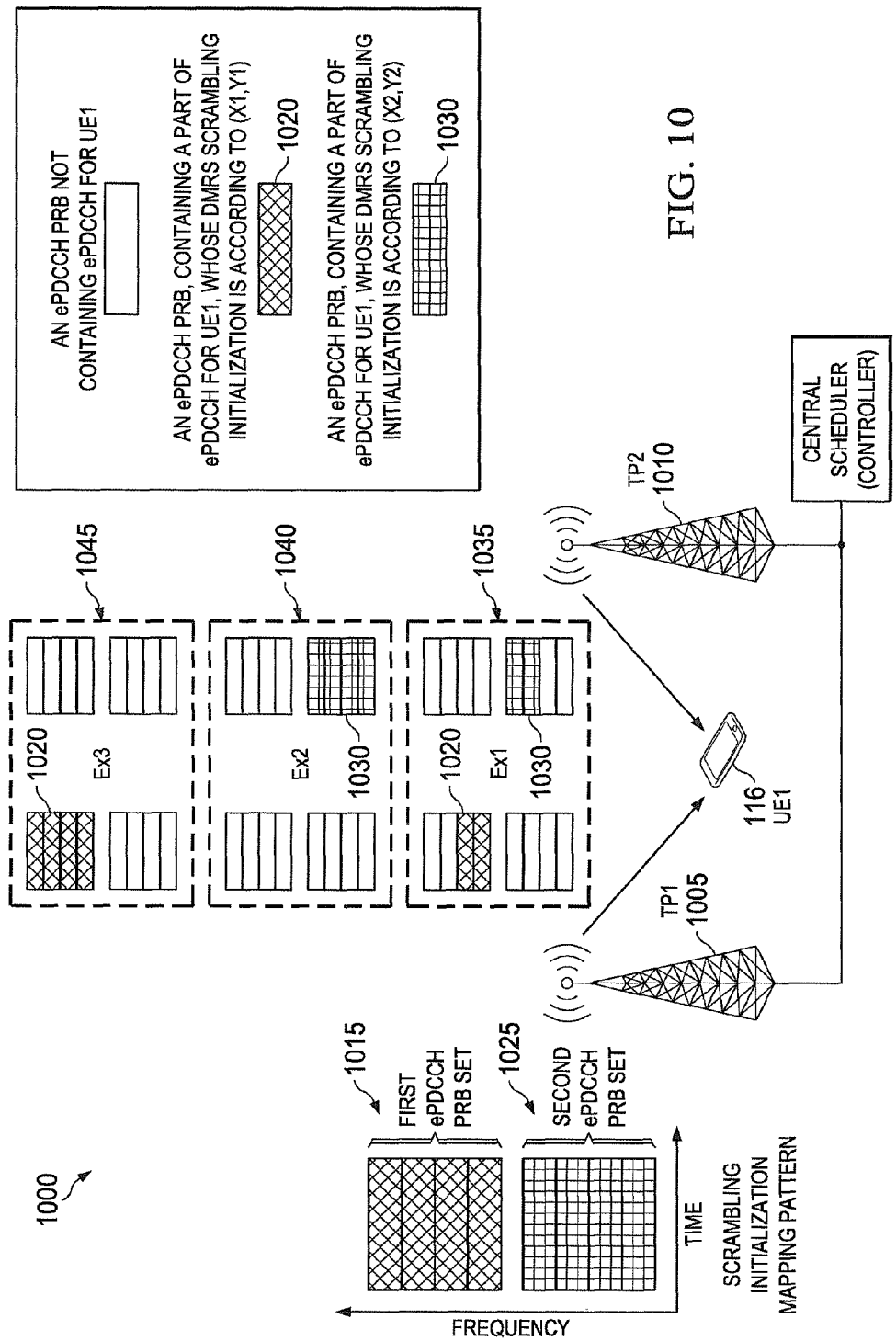
FIG. 10 illustrates an example of e-PDCCH transmissions according to embodiments of the present disclosure.

FIG. 10 illustrates an example of e-PDCCH transmissions according to method 2, alternative 3 or method 3. The embodiment of the e-PDCCH transmissions 1000 shown in FIG. 10 is for illustration only. Other embodiments could be used without departing from the scope of this disclosure.

In certain embodiments, the scrambling initialization pattern is constructed such that a first group of consecutive PRBs is assigned with a first scrambling initialization, and a second group of consecutive PRBs is assigned with a second scrambling initialization. The right hand side of FIG. 10 shows three example e-PDCCH transmissions from at least one of the two transmission points (TPs) 1005, 1010.

In certain embodiments, the scrambling initialization pattern is constructed such that a first set of e-PDCCH PRBs 1015 is assigned with a first scrambling initialization 1020, and a second set of e-PDCCH PRBs 1025 is assigned with a second scrambling initialization 1030. The right hand side of FIG. 10 shows three example e-PDCCH transmissions from at least one of the two transmission points (TPs), 1005, 1010. In Ex1 1035, a first DCI 1040 is transmitted from TP1 1005 with the first DMRS scrambling initialization 1020, and a second DCI is transmitted from TP2 1010 with the second DMRS scrambling initialization 1030. In Ex2 1040, at least one DCI is transmitted from TP2 1010, each with the second DMRS scrambling initialization 1030. In Ex3 1045, at least one DCI is transmitted form TP1 1005, each with the first DMRS scrambling initialization 1020.

Figure 11:
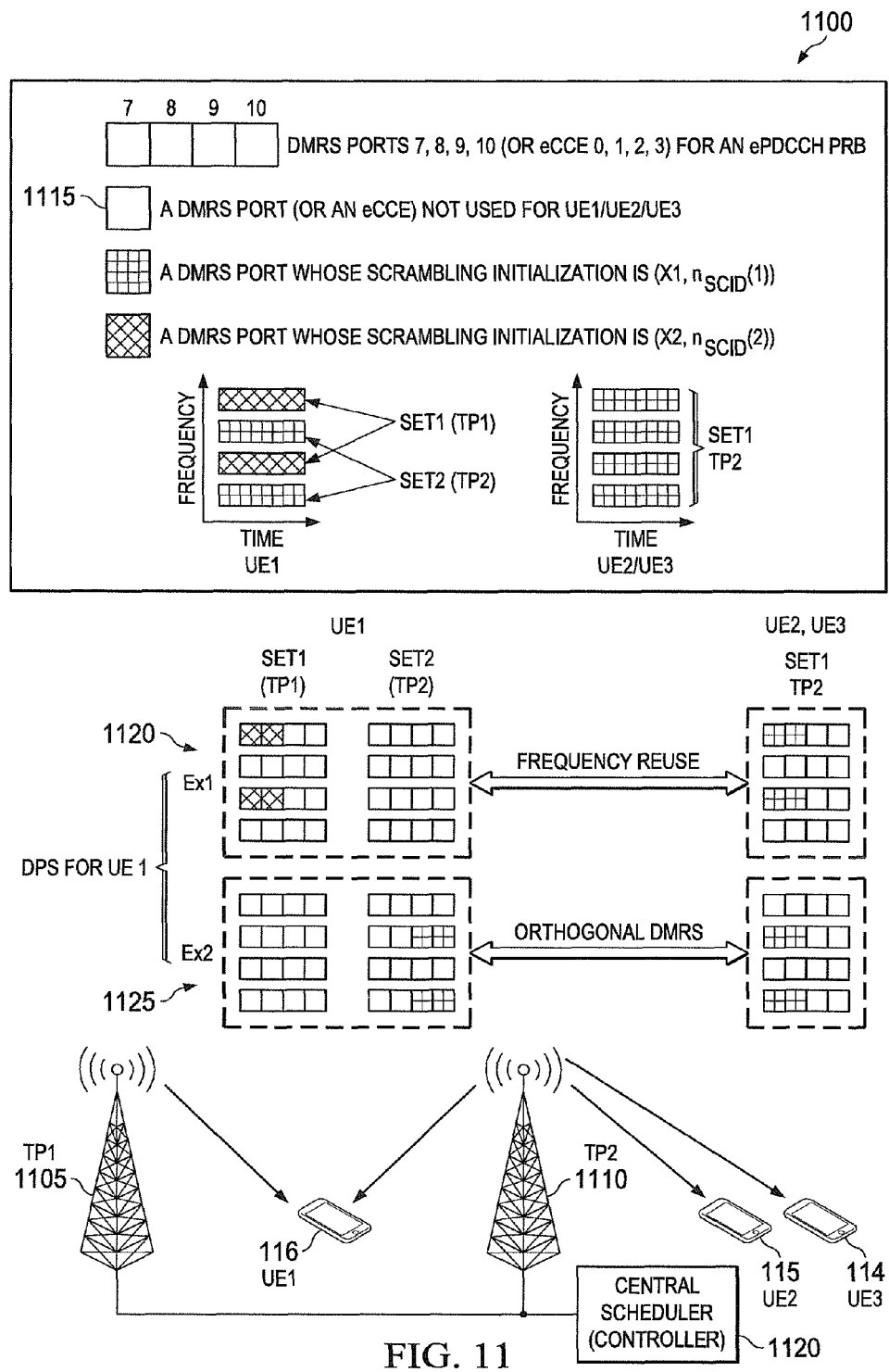
FIG. 11 illustrates e-PDCCH transmissions to a coordinated multipoint (COMP) UE according to embodiments of the present disclosure.

FIG. 11 illustrates e-PDCCH transmissions to a coordinated multipoint (COMP) UE according to embodiments of the present disclosure. The embodiment of the e-PDCCH transmissions shown in FIG. 11 is for illustration only. Other embodiments could be used without departing from the scope of this disclosure.

The EPDCCH transmissions are to a CoMP UE, i.e., UE 116 placed at similar distances from TP1 1105 and TP2 1110, and non-CoMP UEs, i.e., UE 115 and UE 114, which are close to TP2 1110. The e-PDCCH PRBs 1115 not containing e-PDCCH for UE 116/UE 115/UE 114 can be used for transmitting e-PDCCH to other UEs.

In Ex1 1120, an e-PDCCH for UE 116 is transmitted across two PRBs, where the two PRBs are scrambled according to (X1, Y1) and transmitted from TP1 1105 as a result of dynamic point selection (DPS). The two PRBs are transmitted from TP1 1105, which is the better TP for the e-PDCCH reception. At the same time, UE 115 and UE 114 near TP2 1110 can receive e-PDCCH in the same time-frequency resource with a differently scrambled DMRS for spatial reuse.

In Ex2 1125, an e-PDCCH for UE 116 is transmitted across two PRBs, where the two PRBs are scrambled according to (X2, Y2). The two PRBs are transmitted from TP2 1110, which is the better TP for the e-PDCCH reception. At the same time, UE 115 and UE 114 near TP2 1110 can receive e-PDCCH in the same PRB with different DMRS ports for orthogonal DMRS multiplexing.

In another method (Method 4), e-PDCCH DMRS configuration parameter(s) $(n_{ID}^{EPDCCH}(k), n_{SCID}^{EPDCCH}(k))$ are independently configurable for each e-PDCCH PRB set for the localized e-PDCCH transmissions, while a common DMRS configuration parameter(s) are configured for all the e-PDCCH PRB sets for the distributed ePDCCH transmissions. In some embodiments, $n_{SCID}^{EPDCCH}(k)$ is fixed as a constant (e.g., $n_{SCID}^{EPDCCH}(k)=0$ for all k). Therefore, $n_{SCID}^{EPDCCH}(k)$ does not need to be signaled to UE 116.

When $K=K_L+K_D$ is the total number of the e-PDCCH PRB sets, $K_L$ is the total number of configured PRB sets for localized transmissions and $K_D$ is the total number of configured PRB sets for distributed transmissions.

Two alternatives can be utilized to configure the $K_L$ pairs of e-PDCCH DMRS parameters for localized transmission:

In a first alternative (Alt 1): The $K_L$ pairs of e-PDCCH DMRS parameters are independently RRC configured. Independently configuring the $K_L$ has an advantage of being fully flexible in choosing the e-PDCCH DMRS parameters.

In a second alternative (Alt 2): A PDSCH UE-RS scrambling ID (i=0,1) is configured for each of the $K_L$ pairs of e-PDCCH DMRS parameters. When the PDSCH UE-RS scrambling ID configured for set k is i, then, $(n_{ID}^{EPDCCH}(k)=n_{ID}^{DMRS,i}, n_{SCID}^{EPDCCH}(k)=i)$ is used for the e-PDCCH scrambling. Here, $n_{ID}^{DMRS,i}$ is the i-th virtual cell ID associated with scrambling ID i, configured in the higher layer for PDSCH UE-RS. This alternative (Alt 2) has an advantage of reducing RRC signaling overhead.

Alternatively, three alternatives can be utilized to configure the one common pair of the e-PDCCH DMRS parameters for distributed transmissions:

In a first alternative (Alt 1): The one common pair of the e-PDCCH DMRS parameters is RRC configured, independently from the $K_L$ pairs of e-PDCCH DMRS parameters. This alternative (Alt 1) has an advantage of being fully flexible in choosing the e-PDCCH DMRS parameters.

In a second alternative (Alt 2): The one common pair of e-PDCCH DMRS parameters for distributed transmission is set according to the physical cell ID (PCID), e.g., $(n_{ID}^{EPDCCH}$ (k)=PCID, $n_{SCID}^{EPDCCH}(k)$=0), for each k corresponding to a distributed e-PDCCH set. This alternative (Alt 2) does not require any RRC signaling, and hence completely eliminates the RRC overhead.

In a third alternative (Alt 3): The one common pair of e-PDCCH DMRS parameters for distributed transmission is set according to one of the virtual cell IDs configured for PDSCH UE-RS.

In one example, $(n_{ID}^{EPDCCH}(k) = n_{ID}^{DMRS,0}$, $n_{SCID}^{EPDCCH}(k)$=0), for each k corresponding to a distributed e-PDCCH set, where $n_{ID}^{DMRS,0}$ is the first virtual cell ID (associated with scrambling ID i) configured in the higher layer for PDSCH UE-RS.

In another example, a PDSCH UE-RS scrambling ID is configured for the one pair of the e-PDCCH DMRS. Then, $(n_{ID}^{EPDCCH}(k) = n_{ID}^{DMRS,i}$, $n_{SCID}^{EPDCCH}(k)$=i), for each k corresponding to a distributed e-PDCCH set. Here, $n_{ID}^{DMRS,i}$ is the i-th virtual cell ID associated with scrambling ID i, configured in the higher layer for PDSCH UE-RS. Configuring the PDSCH UE-RS scrambling ID for the one pair of the e-PDCCH DMRS has an advantage of reducing RRC signaling overhead.

In this case, the pseudo-random sequence generator for the DMRS of a PRB in e-PDCCH PRB set k is initialized according to Equation 12:

$$c_{init} = (\lfloor n_s/2 \rfloor + 1) \cdot (2n_{ID}^{EPDCCH}(k) + 1) \cdot 2^{16} + n_{SCID}^{EPDCCH}(k) \quad [\text{Eqn. 12}]$$

at the start of each subframe.

In another method (Method 5), two e-PDCCH DMRS configuration parameter pairs $(n_{ID}^{EPDCCH}(k), n_{SCID}^{EPDCCH}(k))$ are configured, one for the localized e-PDCCH transmissions and the other for the distributed e-PDCCH transmissions.

In this case, the pseudo-random sequence generator for the DMRS of a PRB in e-PDCCH PRB set for the distributed transmissions shall be initialized using Equation 13:

$$c_{init} = (\lfloor n_s/2 \rfloor + 1) \cdot (2n_{ID}^{EPDCCH-Distributed} + 1) \cdot 2^{16} n_{SCID}^{EPDCCH-Distributed} \quad [\text{Eqn. 13}]$$

at the start of each sub-frame, and the pseudo-random sequence generator for the DMRS of a PRB in e-PDCCH PRB set for the localized transmissions shall be initialized Equation 14:

$$c_{init} = (\lfloor n_s/2 \rfloor + 1) \cdot (2n_{ID}^{EPDCCH-Localized} + 1) \cdot 2^{16} n_{SCID}^{EPDCCH-Localized} \quad [\text{Eqn. 14}]$$

where $(n_{ID}^{EPDCCH-Distributed}, n_{SCID}^{EPDCCH-Distributed})$ and $(n_{ID}^{EPDCCH-Localized}, n_{SCID}^{EPDCCH-Localized})$ are separately higher-layer (RRC) configured.

In another embodiment (Embodiment 2), UE 116 is configured to assume a quasi co-location of DM-RS ports for e-PDCCH according to specified conditions.

In one method of embodiment 2, UE 116 does not assume that the DM-RS ports for e-PDCCH are quasi co-located across e-PDCCH sets. UE 116 can assume that DM-RS ports for e-PDCCH within an e-PDCCH set are quasi co-located. This is because different e-PDCCH set may be transmitted by different transmission points.

In another method of embodiment 2, UE 116 does not assume that the DM-RS ports for e-PDCCH are quasi co-located if e-PDCCH DM-RS scrambling IDs are not the same. The DM-RS ports for e-PDCCH with the same e-PDCCH DM-RS scrambling IDs may be assumed by UE 116 to be quasi co-located. This is because DM-RS scrambling IDs are typically different for different transmission points.

For example, based on Method 3 of Embodiment 1, UE 116 does not assume that the DM-RS ports across e-PDCCH sets are quasi co-located.

For example, based on Method 4 of Embodiment 1: UE 116 does not assume that the DM-RS ports across localized e-PDCCH sets with different e-PDCCH DM-RS scrambling IDs are quasi co-located. The DM-RS ports across localized e-PDCCH sets with the same e-PDCCH DM-RS scrambling IDs can be assumed by UE 116 to be quasi co-located. Alternatively, the DM-RS ports across distributed e-PDCCH sets can be assumed by UE 116 to be quasi co-located (since the DM-RS ports share the same e-PDCCH DM-RS scrambling IDs). Furthermore, UE 116 does not assume that the DM-RS ports between localized e-PDCCH and distributed e-PDCCH are quasi co-located if the e-PDCCH DM-RS scrambling IDs for localized e-PDCCH and distributed e-PDCCH are different. The DM-RS ports between localized e-PDCCH and distributed e-PDCCH can be assumed by the UE to be quasi co-located if the e-PDCCH DM-RS scrambling IDs for localized e-PDCCH and distributed e-PDCCH are the same. This further improves e-PDCCH DM-RS channel estimation. In one option, UE 116 does not assume that the DM-RS ports between localized e-PDCCH and distributed e-PDCCH are quasi co-located regardless of whether the DM-RS scrambling IDs are the same or not. This is because transmission points for localized e-PDCCH and distributed e-PDCCH are generally not the same.

For example, based on Method 5 of Embodiment 1, UE 116 does not assume that the DM-RS ports between localized e-PDCCH and distributed e-PDCCH are quasi co-located if the e-PDCCH DM-RS scrambling IDs for localized e-PDCCH and distributed e-PDCCH are different. The DM-RS ports across localized e-PDCCH sets can be assumed by UE 116 to be quasi co-located. The DM-RS ports across distributed e-PDCCH sets can be assumed by UE 116 to be quasi co-located.

In one option, if the DM-RS ports for e-PDCCH have the same DM-RS scrambling ID as that of DM-RS ports for PDSCH, the DM-RS ports for e-PDCCH and the DM-RS ports for PDSCH can be assumed by UE 116 to be quasi co-located; otherwise UE 116 does not assume quasi co-location of the DM-RS ports for e-PDCCH and the DM-RS ports for PDSCH. In another option, UE 116 does not assume that the DM-RS ports for e-PDCCH are quasi co-located with the DM-RS ports for PDSCH regardless of DM-RS scrambling IDs.

For each set of quasi co-located DM-RS ports, the network configures a reference NZP CSI-RS resource/a reference CRS resource that can be assumed to the quasi co-located with the DM-RS ports.

e-PDCCH Scrambling

In some systems, PDCCH is scrambled as in the following, according to 36.211 specifications.

The block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ is scrambled with a cell-specific sequence prior to modulation, resulting in a block of scrambled bits $\tilde{b}(0), \ldots, \tilde{b}(M_{tot}-1)$ according to Equation 15:

$$\tilde{b}(i) = (b(i) + c(i)) \bmod 2 \quad [\text{Eqn. 15}]$$

where the scrambling sequence c(i) is given by Section 7.2. The scrambling sequence generator is initialized with equation 16:

$$c_{init} = \lfloor n_s/2 \rfloor 2^9 + N_{ID}^{cell} \quad [\text{Eqn. 16}]$$

at the start of each subframe.

If the same scrambling initialization is reused for e-PDCCH, area splitting is not achieved for e-PDCCH transmissions in CoMP scenario 4, because the same physical cell ID ($N_{ID}^{cell}$) is used by multiple small TPs and the e-PDCCH scrambling initialization would be determined only depending on cell-specific parameters, cell i.e., $N_{ID}^{cell}$ and slot number $n_s$. In order to provide area splitting and to achieve inter-TP interference reduction for e-PDCCH transmissions, we propose a few methods for e-PDCCH scrambling.

In certain embodiments (Embodiment 3), e-PDCCH scrambling method is performed.

In one method (Embodiment 3, method 1), e-PDCCH scrambling initialization is determined by a VCID X, where X replaces the physical cell ID $N_{ID}^{cell}$ in the PDCCH scrambling initialization equation. In other words, e-PDCCH scrambling initialization is:

$$c_{init}=\lfloor n_s/2 \rfloor 2^9 + X \qquad [\text{Eqn. 17}].$$

When this method is implemented, area splitting gain for CoMP scenario 4 can be achieved.

In one alternative, a single (or common) X is used for e-PDCCH scrambling in all the e-PDCCH sets configured for UE 116.

In one example, X is configured independently of the VCID configured for e-PDCCH DMRS. In another example, X is the same as the VCID configured for e-PDCCH DMRS, which is also commonly used for all the e-PDCCH sets.

In one alternative, the eNodeB (e.g., BS 102) uses set-specific X's for e-PDCCH scrambling in the e-PDCCH sets configured for UE 116 (i.e., for e-PDCCH scrambling, a first X value is used for a first e-PDCCH set; and a second X value is used for a second e-PDCCH set).

In one example, the eNodeB (e.g., BS 102) configures X's independently of the VCIDs configured for e-PDCCH DMRS.

In another example, the eNodeB (e.g., BS 102) uses the same X for ePDCCH scrambling in an e-PDCCH set as the VCID configured for e-PDCCH DMRS in the same e-PDCCH set (i.e., for an e-PDCCH set, a common VCID is configured for e-PDCCH scrambling and e-PDCCH DMRS scrambling). That is, the X used for ePDCCH scrambling in an e-PDCCH set is the same as the VCID configured for e-PDCCH DMRS in the same e-PDCCH set.

When Method 4 in embodiment 1 is used for e-PDCCH DMRS configuration, the $K_L$ VCIDs are used for e-PDCCH scrambling as well as e-PDCCH DMRS scrambling in the respective e-PDCCH sets for localized transmissions, and the one VOID configured for distributed transmissions is used for e-PDCCH scrambling as well as e-PDCCH DMRS scrambling for distributed transmissions.

When Method 5 in embodiment 1 is used for e-PDCCH DMRS configuration, the one VOID is used for e-PDCCH scrambling as well as e-PDCCH DMRS scrambling for localized transmissions, and the one VOID configured for distributed transmissions is used for e-PDCCH scrambling as well as e-PDCCH DMRS scrambling for distributed transmissions.

In another method (Embodiment 3, method 2), e-PDCCH scrambling initialization is determined by a VOID X, as well as the UE-ID or RNTI number, $n_{RNTI}$.

When this method (Embodiment 3, method 2) is implemented, the scrambling initialization for e-PDCCH scrambling is determined UE-specifically.

In one example, $C_{init}=n_{RNTI} \cdot 2^{14}+\lfloor n_s/2 \rfloor \cdot 2^9 + X$ and $n_{RNTI}$ is C-RNTI.

In another example, $c_{init}=n_{RNTI} \cdot 2^{14}+\lfloor n_s/2 \rfloor \cdot 2^9 + X$ and $n_{RNTI}$ is SPS C-RNTI.

In these examples, the eNodeB (e.g., BS 102) configures X in a same way as listed in Method 1 (Embodiment 3, method 1), of the current embodiment. In that case, the scrambling initialization ensures to achieve area splitting for e-PDCCH transmissions in CoMP scenario 4.

Note that the false alarm probability of UE-specific scrambling initialization is smaller than that of cell-specific initialization. To see this, consider the cell-specific scrambling initialization used for PDCCH first. The false alarm is defined as an event that a first UE assigned with a first RNTI obtains a CRC check for a PDCCH sent for a second UE assigned with a second RNTI. Here, CRC of the PDCCH sent for each UE is scrambled with its respective RNTI. In addition, if is further assumed that the first RNTI and the second RNTI are of length B bits, and they differ in A bit-locations (for example, the first RNTI=1100<u>1100</u> and the second RNTI=1100<u>0011</u>, in which case B=8 and A=4, and the A bit-locations are the four least significant bits (LSBs)—underlined). In this case, when the cell-specific scrambling initialization is applied for PDCCH, the first UE will obtain a false CRC check for the PDCCH sent for the second UE, when the CRC bits in the A bit-locations are flipped by the channel noise, and the non-CRC part of the PDCCH does not play any role to reduce the false alarm probability.

However, when UE-specific scrambling initialization is applied for e-PDCCH, the non-CRC part of the e-PDCCH of the first UE will be different from that of the second UE as well as the CRC part of the e-PDCCH, which will help to reduce false alarm probability.

In another method (Embodiment 3, method 3), distributed ePDCCH scrambling initialization is determined by Method 1 (Embodiment 3, method 1) in the current embodiment, and localized ePDCCH scrambling initialization is determined by Method 2 (Embodiment 3, method 2) in the current embodiment.

Although the present disclosure has been described with an exemplary embodiment, various changes and modifications may be suggested to one skilled in the art. Additionally, it is within the scope of this disclosure for elements from one or more embodiments to be combined with elements from another embodiment. It is intended that the present disclosure encompass such changes and modifications as fall within the scope of the appended claims.

What is claimed is:

1. For use in a wireless communications network, a base station configured to communicate with a plurality of base stations via a backhaul link and configured to communicate with a plurality of subscriber stations, the base station comprising:
a transmit path configured to transmit data, reference signals, synchronization signals and control elements to at least one of the plurality of user equipments (UEs); and
processing circuitry configured to configure enhanced physical downlink control channel (e-PDCCH) downlink modulated reference signals (DMRS) parameters for each of a plurality of e-PDCCH sets, wherein the e-PDCCH DMRS parameters are used to create one or more DMRS scrambling initializations for one or more e-PDCCH physical resource blocks (PRBs).

2. The base station as set forth in claim 1, wherein the processing circuitry comprises a pseudo-random sequence generator configured to initialize using an equation defined by $$c_{init}=(\lfloor n_s/2 \rfloor+1) \cdot (2n_{ID}^{EPDCCH}(k)+1) \cdot 2^{16}+n_{SCID}^{EPDCCH}(k)$$

where $c_{init}$ is an initialization value for the pseudo-random sequence generator, $n_s$ corresponds to a slot index, $(n_{ID}^{EPDCCH}(k), n_{SCID}^{EPDCCH}(k))$ is higher-layer radio resource control (RRC) configured for k=0, 1, ..., K−1 and K is a total number of the e-PDCCH PRB sets.

3. The base station as set forth in claim 1, wherein the e-PDCCH DMRS parameters are independently configurable for each set.

4. The base station as set forth in claim 1, wherein the processing circuitry is configured to configure a physical downlink shared channel (PDSCH) user equipment-reference signal (UE-RS) scrambling ID for each of the e-PDCCH DMRS parameters.

5. The base station as set forth in claim 1, wherein the processing circuitry comprises a pseudo-random sequence generator configured to initialize using an equation defined by $$c_{init}=(\lfloor n_s/2 \rfloor+1)\cdot(2n_{ID}^{EPDCCH}+1)\cdot 2^{16}+n_{SCID}^{EPDCCH},$$

where $c_{init}$ is an initialization value for the pseudo-random sequence generator, $n_s$ corresponds to a slot index, and ($n_{ID}^{EPDCCH}$, $n_{SCID}^{EPDCCH}$) is higher-layer radio resource control (RRC).

6. The base station as set forth in claim 1, wherein the processing circuitry is configured to construct a scrambling initialization pattern such that a first group of consecutive physical resource blocks (PRBs) is assigned with a first DMRS scrambling initialization and a second group of consecutive PRBs is assigned with a second DMRS scrambling initialization.

7. For use in a wireless communications network, a method for configuring downlink modulated reference signals (DMRS), the method comprising:
    transmitting data, reference signals, synchronization signals and control elements to at least one of a plurality of subscriber stations; and
    configuring enhanced physical downlink control channel (e-PDCCH) DMRS parameters for each of a plurality of e-PDCCH sets, wherein the e-PDCCH DMRS parameters are used to create one or more DMRS scrambling initializations for one or more e-PDCCH physical resource blocks (PRBs).

8. The method as set forth in claim 7, wherein configuring comprises initializing a pseudo-random sequence generator using an equation defined by $$c_{init}=(\lfloor n_s/2 \rfloor+1)\cdot(2n_{ID}^{EPDCCH}(k)+1)\cdot 2^{16}+n_{SCID}^{EPDCCH}(k)$$

where $c_{init}$ is an initialization value for the pseudo-random sequence generator, $n_s$ corresponds to a slot index, ($n_{ID}^{EPDCCH}(k)$, $n_{SCID}^{EPDCCH}(k)$) is higher-layer radio resource control (RRC) configured for k=0, 1, ..., K−1 and K is a total number of the e-PDCCH PRB sets.

9. The method as set forth in claim 7, wherein the e-PDCCH DMRS parameters are independently configurable for each set.

10. The method as set forth in claim 7, wherein configuring comprises configuring a physical downlink shared channel (PDSCH) user equipment-reference signal (UE-RS) scrambling ID for each of the e-PDCCH DMRS parameters.

11. The method as set forth in claim 7, wherein configuring comprises initializing a pseudo-random sequence generator using an equation defined by $$c_{init}=(\lfloor n_s/2 \rfloor+1)\cdot(2n_{ID}^{EPDCCH}+1)\cdot 2^{16}+n_{SCID}^{EPDCCH},$$

where $c_{init}$ is an initialization value for the pseudo-random sequence generator, $n_s$ corresponds to a slot index, and ($n_{ID}^{EPDCCH}$, $n_{SCID}^{EPDCCH}$) is higher-layer radio resource control (RRC).

12. The method as set forth in claim 7, wherein configuring comprises constructing a scrambling initialization pattern such that a first group of consecutive physical resource blocks (PRBs) is assigned with a first DMRS scrambling initialization and a second group of consecutive PRBs is assigned with a second DMRS scrambling initialization.

13. The method as set forth in claim 12, wherein transmitting further comprises transmitting a first downlink control information (DCI) with the first DMRS scrambling initialization and a second DCI with the second DMRS scrambling initialization.

14. The method as set forth in claim 12, wherein transmitting further comprises transmitting at least one DCI, each with the second DMRS scrambling initialization.

15. The method as set forth in claim 12, wherein transmitting further comprises transmitting at least one DCI, each with the first DMRS scrambling initialization.

16. For use in a wireless communications network, a subscriber station configured to communicate with at least one base station, wherein the base station is configured to communicate with a plurality of base stations via a backhaul link, the subscriber station comprising:
    a receiver configured to receive data, reference signals, synchronization signals and control elements from the base station; and
    processing circuitry configured to read physical resource blocks (PRBs) containing enhanced physical downlink control channel (e-PDCCH) downlink modulated reference signals (DMRS) parameters that have been configured for each of a plurality of e-PDCCH sets, wherein the e-PDCCH DMRS parameters have been used to create one or more DMRS scrambling initializations for one or more e-PDCCH PRBs.

17. The subscriber station as set forth in claim 16, wherein the processing circuitry is configured to not initially associate a plurality of demodulation reference signal (DM-RS) ports for e-PDCCH with a same quasi co-location across the plurality of e-PDCCH sets.

18. The subscriber station as set forth in claim 17, wherein the processing circuitry is configured to initially associate DM-RS ports for e-PDCCH within an e-PDCCH set with a same quasi co-location.

19. The subscriber station as set forth in claim 17, wherein the processing circuitry is configured to not initially associate DM-RS ports across localized e-PDCCH sets with different e-PDCCH DM-RS scrambling IDs with a same quasi co-location.

20. The subscriber station as set forth in claim 16, wherein the processing circuitry is configured to generate DM-RS scrambling initialization according to an equation defined by:

$$c_{init}=(\lfloor n_s/2 \rfloor+1)\cdot(2X+1)\cdot 2^{16}+Y$$

where $c_{init}$ is an initialization value for the pseudo-random sequence generator, $n_s$ corresponds to a slot index, and at least one of X and Y is dynamically configured by a downlink grant DCI format transmitted in a physical downlink control channel (PDCCH).

* * * * *